(12) United States Patent
Williams et al.

(10) Patent No.: US 8,437,370 B2
(45) Date of Patent: May 7, 2013

(54) METHODS FOR ACHIEVING TARGET LOSS RATIO

(75) Inventors: Matthew Robert Williams, Kanata (CA); Mohan Krishna Vemulapali, Nepean (CA)

(73) Assignee: LiveQoS Inc., Ottawa, Ontario (CA)

(*) Notice: Subject to any disclaimer, the term of this patent is extended or adjusted under 35 U.S.C. 154(b) by 159 days.

(21) Appl. No.: 13/021,357

(22) Filed: Feb. 4, 2011

(65) Prior Publication Data

US 2012/0201147 A1 Aug. 9, 2012

(51) Int. Cl.
*H04J 3/24* (2006.01)
*H04L 12/56* (2006.01)
*H04L 12/26* (2006.01)

(52) U.S. Cl.
USPC ........ 370/473; 370/474; 370/401; 370/230.1; 370/232; 370/252; 714/776; 709/224

(58) Field of Classification Search .......... 370/216–218, 370/231–235, 230.1, 252, 254, 229–230, 370/389, 473, 474, 392, 394, 401, 476; 709/224–225; 714/746–755, 776
See application file for complete search history.

(56) References Cited

U.S. PATENT DOCUMENTS

| | | | |
|---|---|---|---|
| 4,908,827 A | 3/1990 | Gates | |
| 5,600,663 A | 2/1997 | Ayanoglu et al. | |

(Continued)

FOREIGN PATENT DOCUMENTS

| | | |
|---|---|---|
| CA | 2450563 | 12/2002 |
| EP | 1 755 248 | 2/2007 |

(Continued)

OTHER PUBLICATIONS

International Search Report, PCT/IB2012/050473, mailed Aug. 24, 2012 (3 pages).

(Continued)

*Primary Examiner* — Kwang B Yao
*Assistant Examiner* — Candal Elpenord
(74) *Attorney, Agent, or Firm* — Nixon Peabody LLP

(57) ABSTRACT

A method of forwarding data transmissions from a first network to a third network via a second network comprises receiving packets of a first type from the first network, segmenting each packet of a first type into packets of a second type, transmitting the packets of a second type to the second network, and producing and transmitting at least one encoded duplicate of each of the packets of a second type to the second network. The encoded duplicate packet allows a packet of the first type to be recreated in the event that not all the packets of the second type are received at the second network. In the event that a sufficient number of the packets of a second type and the encoded duplicate packets are not received to recreate the packet of a first type, the method determines a loss ratio that represents the number of packets not recreated relative to the number of packets transmitted during a selected time interval, dynamically adjusts the overhead required to produce the encoded duplicate packets to attempt to minimize the loss ratio, detects a significant increase in the determined loss ratio over a plurality of the time intervals, successively reduces the overhead required to produce the encoded duplicate packets in response to the detection of a significant increase in the determined loss ratio, and determines whether the reduced overhead requirement stabilizes the determined loss ratio and, if the answer is affirmative, terminates the successive reduction of the overhead requirement.

15 Claims, 22 Drawing Sheets

U.S. PATENT DOCUMENTS

| | | | |
|---|---|---|---|
| 5,677,918 | A | 10/1997 | Tran et al. |
| 5,857,072 | A | 1/1999 | Crowle |
| 6,000,053 | A | 12/1999 | Levine et al. |
| 6,012,159 | A | 1/2000 | Fischer et al. |
| 6,126,310 | A | 10/2000 | Osthoff et al. |
| 6,172,972 | B1 | 1/2001 | Birdwell et al. |
| 6,272,658 | B1 | 8/2001 | Steele et al. |
| 6,278,716 | B1 | 8/2001 | Rubenstein et al. |
| 6,336,200 | B1 | 1/2002 | Wolfgang |
| 6,421,387 | B1 | 7/2002 | Rhee |
| 6,421,805 | B1 | 7/2002 | McAuliffe |
| 6,445,717 | B1* | 9/2002 | Gibson et al. ............. 370/473 |
| 6,449,251 | B1* | 9/2002 | Awadallah et al. |
| 6,529,552 | B1 | 3/2003 | Tsai |
| 6,570,843 | B1 | 5/2003 | Wolfgang |
| 6,606,723 | B2 | 8/2003 | Wolfgang |
| 6,609,223 | B1 | 8/2003 | Wolfgang |
| 6,728,924 | B1* | 4/2004 | Lou et al. ............. 714/776 |
| 6,744,766 | B2 | 6/2004 | Alapuranen |
| 6,868,083 | B2 | 3/2005 | Apostolopoulos et al. |
| 6,876,669 | B2* | 4/2005 | Shalom ............. 370/468 |
| 7,024,609 | B2 | 4/2006 | Wolfgang et al. |
| 7,035,217 | B1 | 4/2006 | Vicisano |
| 7,050,396 | B1 | 5/2006 | Cohen |
| 7,075,936 | B2 | 7/2006 | Hathaway et al. |
| 7,089,478 | B2 | 8/2006 | Cummings et al. |
| 7,133,407 | B2 | 11/2006 | Jinzaki et al. |
| 7,167,704 | B2 | 1/2007 | Chang |
| 7,215,683 | B2* | 5/2007 | Burkert et al. ............. 370/476 |
| 7,310,670 | B1 | 12/2007 | Walbeck et al. |
| 7,319,701 | B2* | 1/2008 | Guven et al. ............. 370/401 |
| 7,739,398 | B1 | 6/2010 | Shabtay |
| 7,742,501 | B2 | 6/2010 | Williams |
| 7,821,937 | B1* | 10/2010 | Guo ............. 370/232 |
| 7,889,654 | B2* | 2/2011 | Ramakrishnan et al. ..... 370/231 |
| 7,936,785 | B2* | 5/2011 | Ehret et al. ............. 370/473 |
| 2001/0009547 | A1 | 7/2001 | Jinzaki et al. |
| 2001/0040088 | A1 | 11/2001 | Araki |
| 2002/0061059 | A1 | 5/2002 | Ginesi |
| 2002/0146016 | A1* | 10/2002 | Liu et al. ............. 370/401 |
| 2003/0002499 | A1 | 1/2003 | Cummings et al. |
| 2003/0018793 | A1 | 1/2003 | Mora |
| 2003/0105997 | A1 | 6/2003 | Mitlin |
| 2003/0108044 | A1 | 6/2003 | Hendel |
| 2003/0152058 | A1 | 8/2003 | Cimini, Jr. |
| 2004/0010736 | A1 | 1/2004 | Alapuranen |
| 2004/0039827 | A1 | 2/2004 | Thomas |
| 2004/0264396 | A1 | 12/2004 | Ginzburg et al. |
| 2005/0130646 | A1 | 6/2005 | Frank et al. |
| 2005/0195859 | A1 | 9/2005 | Mahany |
| 2006/0029101 | A1* | 2/2006 | Williams ............. 370/474 |
| 2006/0031518 | A1 | 2/2006 | Jennings |
| 2006/0178143 | A1 | 8/2006 | Chang et al. |
| 2006/0210037 | A1 | 9/2006 | Olafsson |
| 2007/0011321 | A1* | 1/2007 | Huntington et al. .......... 709/224 |
| 2007/0157060 | A1 | 7/2007 | Ganga |
| 2008/0089268 | A1 | 4/2008 | Kinder et al. |
| 2008/0151776 | A1 | 6/2008 | Kure |
| 2008/0151823 | A1 | 6/2008 | Quigley |
| 2008/0240108 | A1* | 10/2008 | Hyldgaard ............. 370/394 |
| 2009/0006920 | A1 | 1/2009 | Munson et al. |
| 2009/0049189 | A1 | 2/2009 | Zhu et al. |
| 2009/0116487 | A1 | 5/2009 | Read |
| 2009/0135950 | A1 | 5/2009 | Hoffmann |
| 2010/0005177 | A1 | 1/2010 | Cagenius |
| 2010/0023842 | A1* | 1/2010 | Rahrer et al. ............. 714/776 |
| 2010/0080167 | A1 | 4/2010 | Cordeiro |

FOREIGN PATENT DOCUMENTS

| | | |
|---|---|---|
| JP | 10-119426 | 5/1998 |
| JP | 11-225161 | 8/1999 |
| JP | 2000-151623 | 5/2000 |
| JP | 2001-119426 | 4/2001 |
| JP | 2003-196618 | 7/2003 |
| JP | 2003-298560 | 10/2003 |

OTHER PUBLICATIONS

International Written Opinion, PCT/IB2012/050473, mailed Aug. 24, 2012 (6 pages).
International Search Report, PCT/IB2011/050917, mailed Jun. 22, 2011 (3 pages).
International Written Opinion, PCT/IB2011/050917, mailed Jun. 22, 2011 (4 pages).
European Patent Application No. 09167948.0 Search Report, dated Nov. 26, 2009 (5 pages).
Barakat, C.; Simulation-Based Study of link level Hybrid FEC/ARQ-SR for Wireless Links and Long-Lived TCP Traffic, INRIA Research Report RR-4752; Feb. 2003 (8 pages).
International Search Report, PCT/CA2005/001206, mailed Jun. 22, 2011 (2 pages).
International Written Opinion, PCT/CA2005/001206, mailed Jun. 22, 2011 (6 pages).
Japanese Patent Application No. 2007-524146, Office Action dated Sep. 28, 2010 (9 pages).

* cited by examiner

METHODS FOR ACHIEVING TARGET LOSS RATIO

FIELD OF THE INVENTION

The present invention relates to communication data networks. More specifically, the present invention relates to systems and methods for increasing the throughput of data transmissions through a network as seen from the edge of the network.

BACKGROUND OF THE INVENTION

To enable data communication from a source end-station or network to a destination end-station or network, packet-based networks break-up data streams into smaller packets of data. As these packets traverse a network, some of these packets can be lost due to congestion or other network limitations. This loss can have a tremendous impact on the applications leveraging the communication channel between the source and destination end-stations. Ideally, a network, from the point of view of many applications, must provide perfect performance with deterministic packet latency and no packet loss. However, the capital and operational cost to achieve perfect network performance is not practical for most service and enterprise network providers.

Accordingly, systems and methods are required which can be used with low cost networks to provide applications with a high network performance. One approach is to create new encoding protocol stacks which are installed at the end-stations to improve the response to loss and latency. However, this approach is non-trivial since all end-stations in the source and destination networks must be upgraded to use the new encoding protocol stacks.

Another approach uses network devices that intercept standard protocols, and an encoding protocol between the intercepting network devices, to recover from network loss. These devices are deployed in areas of the network where resident applications require better network performance than what is generally available in the network itself. Such devices are described in pending U.S. application Ser. No. 12/718,650, filed Mar. 5, 2010, which is a continuation-in-part of U.S. application Ser. No. 12/193,345, filed Aug. 18, 2008, which is a continuation-in-part of U.S. application Ser. No. 10/912,200, filed Aug. 6, 2004 now U.S. Pat. No. 7,742,501.

The encoding protocol is intended to reduce loss. To achieve this goal, the encoding protocol increases the overall bandwidth required within the network. The increase in bandwidth can actually result in increasing loss instead due to network constraints. The intercepting network device needs to detect this issue and react to ensure that the communicating end-stations achieve the desired application performance.

SUMMARY OF THE INVENTION

In accordance with one embodiment, a method of forwarding data transmissions from a first network to a third network via a second network comprises receiving packets of a first type from the first network, segmenting each packet of a first type into packets of a second type, transmitting the packets of a second type to the second network, and producing and transmitting at least one encoded duplicate of each of the packets of a second type to the second network. The encoded duplicate packet allows a packet of the first type to be recreated in the event that not all the packets of the second type are received at the second network. In the event that a sufficient number of the packets of a second type and the encoded duplicate packets are not received to recreate the packet of a first type, the method determines a loss ratio that represents the number of packets not recreated relative to the number of packets transmitted during a selected time interval, dynamically adjusts the overhead required to produce the encoded duplicate packets to attempt to minimize the loss ratio, detects a significant increase in the determined loss ratio over a plurality of the time intervals, successively reduces the overhead required to produce the encoded duplicate packets in response to the detection of a significant increase in the determined loss ratio, and determines whether the reduced overhead requirement stabilizes the determined loss ratio and, if the answer is affirmative, terminates the successive reduction of the overhead requirement.

In one implementation, the overhead required to produce the encoded duplicate packets is reduced by adjusting an encoding level in the production of the encoded duplicate packets in response to the detection of a significant increase in the determined loss ratio over the plurality of time intervals. For example, the encoding level may be decreased sufficiently to stop increases in said loss ratio. The significant increase in the determined loss ratio over a plurality of the time intervals may be detected by determining the change in the loss ratio, or an average of the loss ratio over the time intervals, and comparing the change with a preselected threshold.

BRIEF DESCRIPTION OF THE DRAWINGS

Embodiments of the present invention will now be described, by way of example only, with reference to the attached Figures, wherein.

DETAILED DESCRIPTION OF THE ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
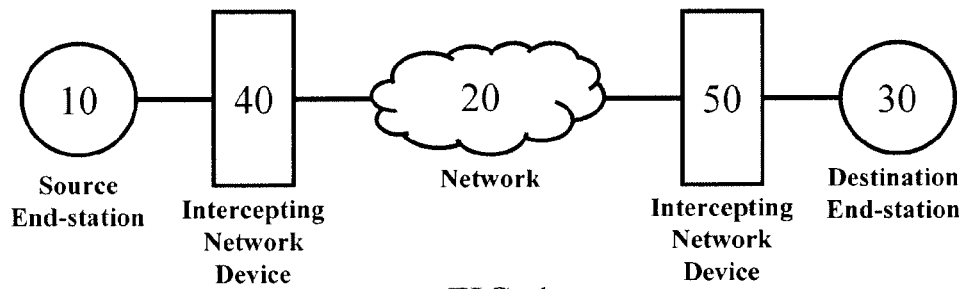
FIG. 1 is a block diagram of an environment in which the invention may be practiced.

FIG. 1 illustrates a network environment in which a source end-station 10 and a destination end-station 30 have applications which communicate using a standard protocol (generally, packet-based). This protocol is carried through a network 20 which can be, for example, the Internet or some other communications network. The end-stations 10 and 30 can be terminals, such as personal computers connected through a modem, local or wide-area networks, or other devices or systems having access to the network 20. For certain applications resident on the end stations 10 and 30, better network performance is required, and packets related to these applications are intercepted by network devices 40 and 50. Referred to as "intercepting" network device, the network devices 40 and 50 encode the standard packets using an encoding protocol to increase network performance. To illustrate how this network operates, standard packet flow is assumed from the source end-station 10 to the destination end-station 30 (i.e., left to right in FIG. 1). The intercepting network device 40 encodes the standard packets from the source end-station 10 and forwards the encoded packets to the intercepting network device 50 through the network 20. The intercepting network device 50 decodes the packets and forwards the reconstituted standard packet to the destination end-station 30. In the reverse direction, packets flowing from the destination end-station 30 to the source end-station 10 are encoded by the intercepting network device 50 and forwarded to the intercepting network device 40 over the network 20. The intercepting network device 40 decodes these packets, and the reconstituted standard packets are forwarded to the source end-station 10.

Figure 2:
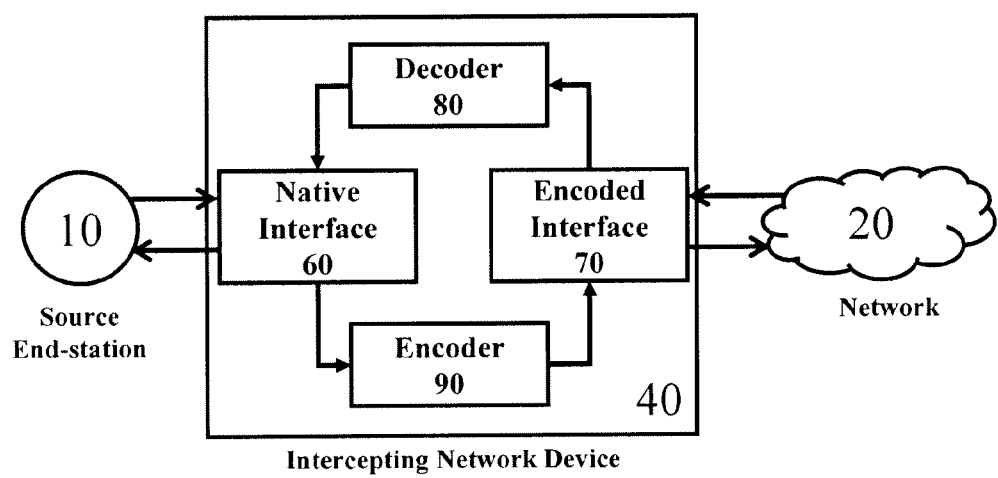
FIG. 2 is a block diagram illustrating the components in an intercepting network device used in FIG. 1.

FIG. 2 depicts an exemplary embodiment of the intercepting network device 40 that includes modules necessary to implement the encoding protocol to improve network performance. The modules can be resident in a single device, or can be distributed amongst several devices. In the illustrative embodiment of FIG. 2, the intercepting network device 40 includes a native interface 60, an encoded interface 70, a decoder 80, and an encoder 90. The native interface 60 sends and receives standard packets to and from the source end-station 10, and the encoded interface 70 sends and receives encoded packets to and from the network 20.

The encoder 80 receives standard packets from the native interface 60 and produces encoded packets by dividing the packet into one or more segments which then are ready for transmission to the network 20 by way of the encoded interface 70. The decoder 90 receives encoded packets from the encoded interface 70 and produces standard packets for transmission to the source end-station 10 by way of the native interface 60.

To assist in recreating the standard packets from the encoded packets, the encoder 90 may also create extra encoded packets. These extra encoded packets are derived from the standard packets and encoded packets. The extra encoded packets assist the decoder in the destination intercepting network device 50 to recreate or reassemble the original standard packets in the event one or more encoded packets are lost during their transmission through the network 20.

Figure 3:
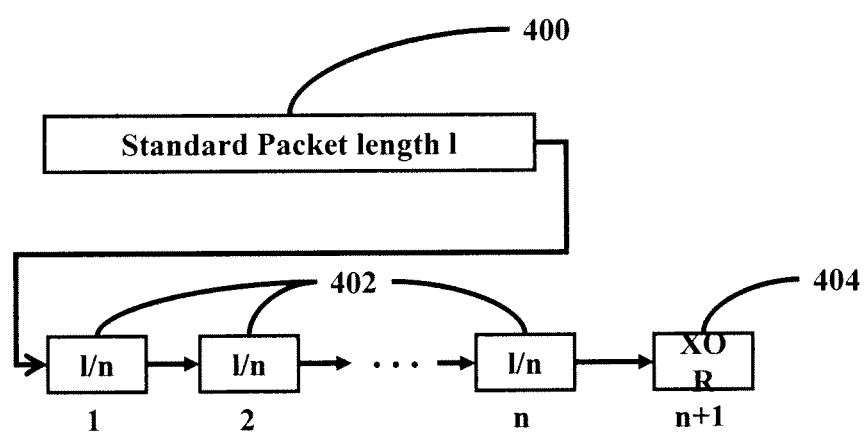
FIG. 3 illustrates an example segmentation and encoding of a standard packet.

The encoding of a standard packet according to one embodiment is illustrated in FIG. 3. To simplify the description, headers have been omitted from the original standard packet and the encoded packets. A standard packet 400 received at an encoder has a packet payload of 1 byte, and is segmented into n segments 402. Where n is chosen as an integer factor of 1, each of the n segments will have 1/n bytes, as shown. In addition, m extra encoded packets are created. In the example shown in FIG. 3, m=1 and the additional or extra segment 404 is a parity segment created by applying a logical function (e.g., XOR function) to all of the n segments.

Once the encoder has completed the process of creating the segments and the extra encoded segment, headers are added to the packets to create encoded packets and extra encoded packets. The headers use a standard protocol such that no proprietary operational functions are expected in the network. Therefore, the encoded and extra encoded packets are carried through the network to the decoding intercepting network element. The encoder can take into account the size of the packet and can increase n automatically to avoid transmitting an encoded packet of a size that would exceed the Maximum Transfer Unit (MTU) of the network when the standard protocol header is added to the encoded packet. This capability can also be useful for splitting jumbo frames prior to entering a network that cannot handle them.

As a decoder reassembles standard packets from the encoded and extra encoded packets, it can deal with loss of encoded packets. If enough information is contained in the extra encoded packets, missing segments caused by lost encoded packets can be recreated. If the loss is too great, the encoder has options. If the standard packet has a limited lifespan (such as a video packet), then the affected standard packet is discarded. If the application natively provides resiliency to packet loss, then again, the standard packet may be discarded. If the standard packet has a reasonable lifespan and the application does not provide resiliency natively, the decoder can request a retransmission of the missing segment from the encoder. This assumes that the encoder buffers the standard packet until it has been successfully decoded on the other end of the network.

To enable higher network performance for communicating applications, an encoding channel is established between intercepting network devices. Examples of how these channels are created are described in U.S. application Ser. No. 12/193,345. For the purpose of this application, an encoded channel between the intercepting network devices 40 and 50 is assumed to be successfully negotiated. The encoded channel is used to carry both data and control information, and encoded packets and extra encoded packets can now be sent and received between the intercepting network devices.

Applications residing on end-stations in the network above can tolerate different levels of lost packets within the communication network. The intercepting network devices can differentiate these applications based upon standard protocol signaling elements. File transfers using FTP are signaled using a TCP port. This will open TCP ports in the 64000 range to transport the files between the end-stations. TCP is resilient to loss and variation of latency within the network. The key goal of the transfer is to ensure that the file arrives intact and in as timely a manner as the network will allow. This application is in contrast to a video conference application. These can be signaled using the Session Initiation Protocol on UDP port 5060 and contains the information for the video, voice and data sessions associated with the conference. Video sessions have a low tolerance to loss; the loss of an eye frame (a complete picture of the screen) can greatly disrupt video compression algorithms. The greater the bandwidth required for a video stream, the lower the tolerance for loss since each standard packet is carrying more information related to the video stream. Voice sessions are relatively more tolerant to loss due to the predictive nature of human speech. Voice codecs are able to fill in gaps to ensure a continuous voice stream. In either case, video and voice sessions need to have less than 1% standard packet loss to avoid video blocking or voice clipping, and most providers attempt to keep standard packet loss at less than 0.5%.

Within the context on a given session, the different streams can be treated with different loss objectives. Deep Packet Inspection (DPI) can be used in the intercepting network devices to detect the type of application (video/voice/data) and set the loss objectives according to a configured network policy for that type of application. Ultimately each standard packet can have its own loss objective based on information provided in the header that identifies the level of protection required (e.g., SVC—scalable video codec). This loss objective is defined as the Target Loss Ratio (TLR).

The TLR can be used to determine the encoding rate which is determined by both n and m. The encoding rate can be adjusted based on observed and/or reported network performance for one or all encoded channels terminating at an encoding component associated with a given intercepting network device. The goal is to set the encoding level such that the encoded channel achieves the TLR for the session or better.

Figure 4:
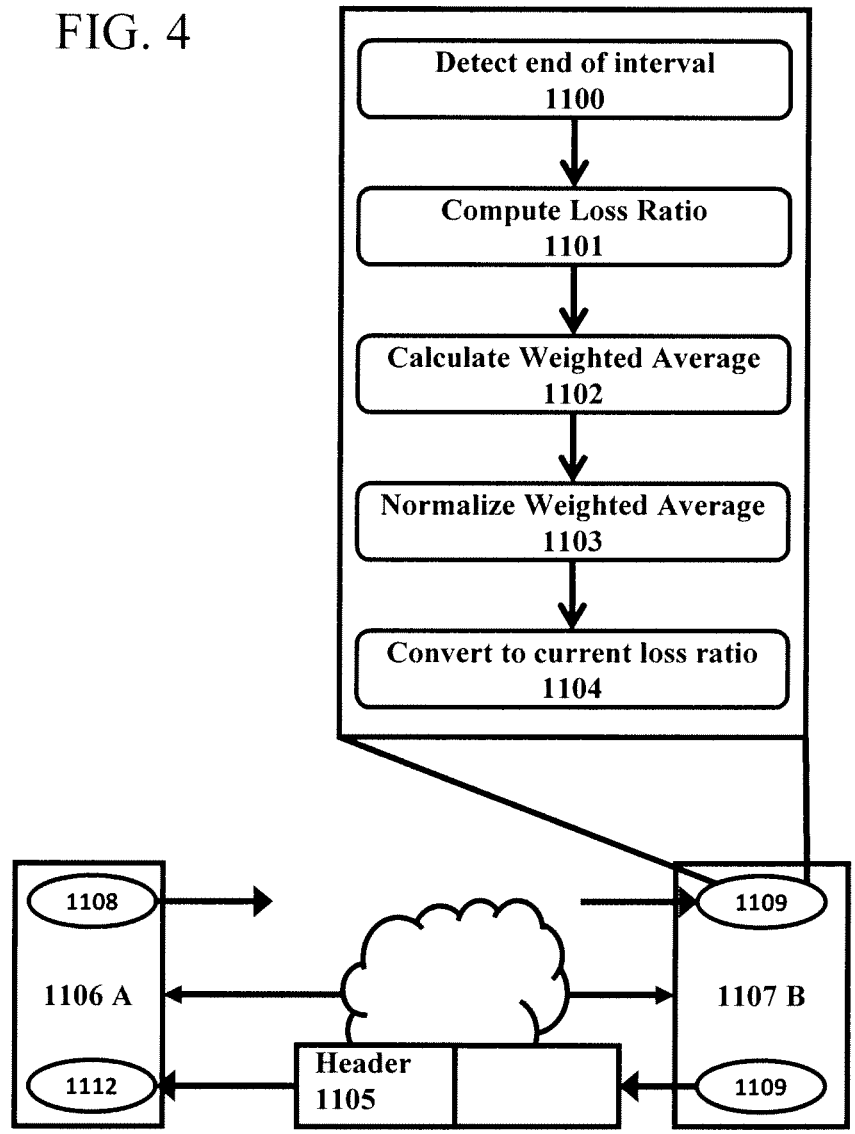
FIG. 4 illustrates a first example algorithm to evaluate loss.

Referring to FIG. 4, the determination of the loss ratio observed is described in relation to the encoded channel between intercepting network device A 1106 and intercepting network device B 1107, more specifically looking at the channel in the direction from intercepting network device A to intercepting network device B. Under a "no loss", or acceptable loss, condition, the encoding can be set to n=1 and m=0 to avoid using extra bandwidth in the network when it is not necessary. The decoder 1109 of the intercepting network device B 1107 counts the number of packets received $P_x$ and the number of packets lost $LP_x$ over an interval of W units of time (for example W=8 seconds) using the subroutine illustrated in FIG. 4. The interval period can also be defined as the reception of a particular number of packets. Alternatively, $LP_x$ can represent the number of retransmission requests, such that the successfully recovered loss is not counted as part of the loss ratio. The end of each interval is detected at step 1100, and the loss ratio $L_x$ is calculated at step 1101 using, for example, the following ratio:

$$L_x = \frac{LP_x}{(LP_x + P_x)} \quad (1)$$

$P_x$ in equation 1 can be the number of standard packets transmitted over the time period W. In this case, $LP_x$ is the number of lost standard packets. This is referred to the $SPL_x$. Another option for $P_x$ is to count the number of encoded segments and extra encoded segments which should have arrived at the decoder to re-assemble the standard packets over the time period W. $LP_x$ then is the number of segments and extra segments which were lost in the network over the time period W. This is referred to the $EPL_x$. In general, $SPL_x$ is lower than $EPL_x$ due to the fact that the encoding scheme helps the decoder recover from loss, allowing standard packets to be reproduced even though encoded packets related to the standard packet were lost. From that perspective, $EPL_x$ is a truer indication of the performance of the network.

The current loss ratio ($L_x$) can refer to loss calculated from measurement of standard packets ($SPL_x$). It can refer to current loss calculated from encoded and extra encoded segments ($EPL_x$). It can also refer to a current loss ratio calculated from the combination of SPLx and EPLx. One example of this combination is:

$$CLR_x = \frac{\omega_S SPL_x + \omega_E EPL_x}{\omega_S + \omega_E} \quad (2)$$

where $\omega_S$ is the weight given to the loss of standard packets and $\omega_E$ is the weight given to the loss of encoded segments.

To avoid reacting to random events, step 1102 computes an average loss over the last z loss measurements. In order to take into account the most recent network status, a weighted average can be performed to weight the most recent current loss ratio measurements, e.g., using the equation:

$$WL_x = \frac{\sum_{i=<z-x>.z} \langle CLR_i \times \omega_i \rangle}{\sum_{i=1.z} \omega_i} \quad (3)$$

where $WL_x$ represents the weighted average of the most recent loss measurements for interval x. The weights are such that $\omega_i < \omega_j$ for $i < j <= x$.

To avoid keeping track of many loss measurements, the previous weighted loss can also be used to evaluate the new weighted loss, e.g., using the equation:

$$WL_x = \frac{\langle WL_{x-1} \times \omega_{old} \rangle + \langle CLR_x \times \omega_{new} \rangle}{\omega_{old} + \omega_{new}} \quad (4)$$

where $\omega_{old}$ and $\omega_{new}$ are weights that are set in general such that $\omega_{old} < \omega_{new}$.

Optionally the weighted loss ratio can be normalized at step 1103 to simplify the lookup using integers only. The normalized loss $NL_x$ can be computed using the following equation:

$$NL_x = \frac{N \times WL_x}{P_x} \quad (5)$$

where N is the normalization factor (e.g., N=10000).

$NL_x$ is then used to index an encoding level table at step 1104 to extract the current encoding level. An example of an encoding level table is shown below, providing 8 levels, where INT_max represents the largest integer or a large value (e.g., 10000).

| $NL_x$ min | $NL_x$ max | Encoding Level |
|---|---|---|
| 0 | 0 | 0 |
| 1 | 75 | 1 |
| 75 | 145 | 2 |
| 146 | 185 | 3 |
| 186 | 210 | 4 |
| 211 | 260 | 5 |
| 261 | 370 | 6 |
| 371 | INT_max | 7 |

The encoder 1111 of the intercepting network device B 1107 then inserts the extracted encoding level 1105 in the header of each encoded packet sent for that session to the intercepting network device A 1106. The decoder 1112 in the intercepting network device A 1106 reads the encoding level from the received packets. It then indexes a new parameter table with the encoding level to obtain the value of l and Max_n, which represents the largest value to which n should be set given the current encoding level. Multiple new parameter tables can be used to achieve different TLRs based on the application requirements and acceptable overhead. An example of such a new parameter table using 8 loss ratios is shown below:

| Encoding Level | Max_n | m |
|---|---|---|
| 0 | INT_max | 0 |
| 1 | INT_max | 1 |
| 2 | INT_max | 1 |
| 3 | 3 | 1 |
| 4 | 2 | 1 |
| 5 | 2 | 1 |
| 6 | 1 | 1 |
| 7 | 1 | 1 | where INT_max represents the largest integer (infinity).

Before the encoder 1108 of the intercepting network device A 1106 encodes a packet of size s, it indexes a preconfigured packet size table with s, to obtain Rec_n, which represents the recommended value of n given the packet size. An example packet size table is show below:

| Packet Size (bytes) | Rec_n |
|---|---|
| <88 | 1 |
| 89 to 264 | 2 |
| 265 to 528 | 3 |
| >528 | 4 |

Using this table, a packet of size s<88 bytes returns Rec_n=1. If s>528 bytes, then Rec_n=4. The value of n used to encode the packet is then determined as n=min(Rec_n, Max_n).

In another embodiment, the decoder 1109 calculates the weighted loss ratio $WL_x$ using equation (3) or (4) above. It can optionally normalize to compute $NL_x$ using equation (5). The exact loss value ($WL_x$ or $NL_x$) is sent at regular intervals (e.g., every second) to the decoder 1112 in a control message that is inserted in the encoded channel for the session. The decoder 1112 extracts the exact loss values from the control messages. The encoder 1108 uses the exact loss value to index a new parameter table to obtain Max_n and m.

| $NL_x$ min | $NL_x$ max | Max_n | m |
|---|---|---|---|
| 0 | 0 | INT_max | 0 |
| 1 | 75 | INT_max | 1 |
| 76 | 145 | INT_max | 1 |
| 146 | 185 | 3 | 1 |
| 186 | 210 | 2 | 1 |
| 211 | 260 | 2 | 1 |
| 261 | 370 | 1 | 1 |
| 371 | 10000 | 1 | 1 |

The value of n is derived as n=min(Rec_n, Max_n). Multiple new parameter tables can be configured to reflect different Target Loss Ratios, and the encoder 1108 uses the appropriate table based on the Target Loss Ratios of the application. Sending the actual loss ratio, instead of the current loss ratio, allows configuration the parameter tables at the encoding side, thus simplifying the configurations.

The previous equations demonstrate how the loss ratio is calculated for individual streams. Using FIG. 5 as an example, an intercepting network device D 1203 calculates the loss ratios of three flows 1204, 1205 and 1206 originating from intercepting network devices A 1202, B 1207 and C 1208, respectively. In addition to returning the loss ratio measured for the flow, the receiving intercepting network device can compute the average of the weighted loss ratio $AL_x$ from the three flows that are sent to it over an interval period x.

The interval period can be the same as the interval period used for calculating the loss ratio for a single flow. The average loss ratio can be calculated, for example, as:

$$AL_x = \frac{\sum_{i=1...f} WL_i}{f} \quad (6)$$

where $WL_i$ can be calculated using equation (3) or (4) above. The $AL_x$ can then be normalized using equation (5) above to create a normalized average loss ratio, $NAL_x$. The $NAL_x$ is then indexed in an encoding level table to obtain an average loss ratio at the far end ($ALFE_x$). The encoding level table can be the same as illustrated above or preconfigured with different numbers. The $ALFN_x$ is added to the packet header of the encoded packets transmitted by the decoder of the intercepting network device D 1203 to the respective intercepting network devices 1202, 1207 and 1208 along with the per flow current loss ratio computed as described above.

If the aggregate information is included in the packet header, the intercepting network device 1202, 1207 or 1208 can use the information to decide whether to change its encoding level. The decoder of the intercepting network device A 1202 also calculates the average loss at the near end ($ALNE_x$) which is the average of the current loss ratio received in the encoding channel from the g encoded sessions 1211, 1212 and 1204 active during a measurement period x, $$ALNE_x = \frac{\sum_{i=1..g} \text{Current Loss Ratio}}{g} \quad (7)$$

Figure 5:
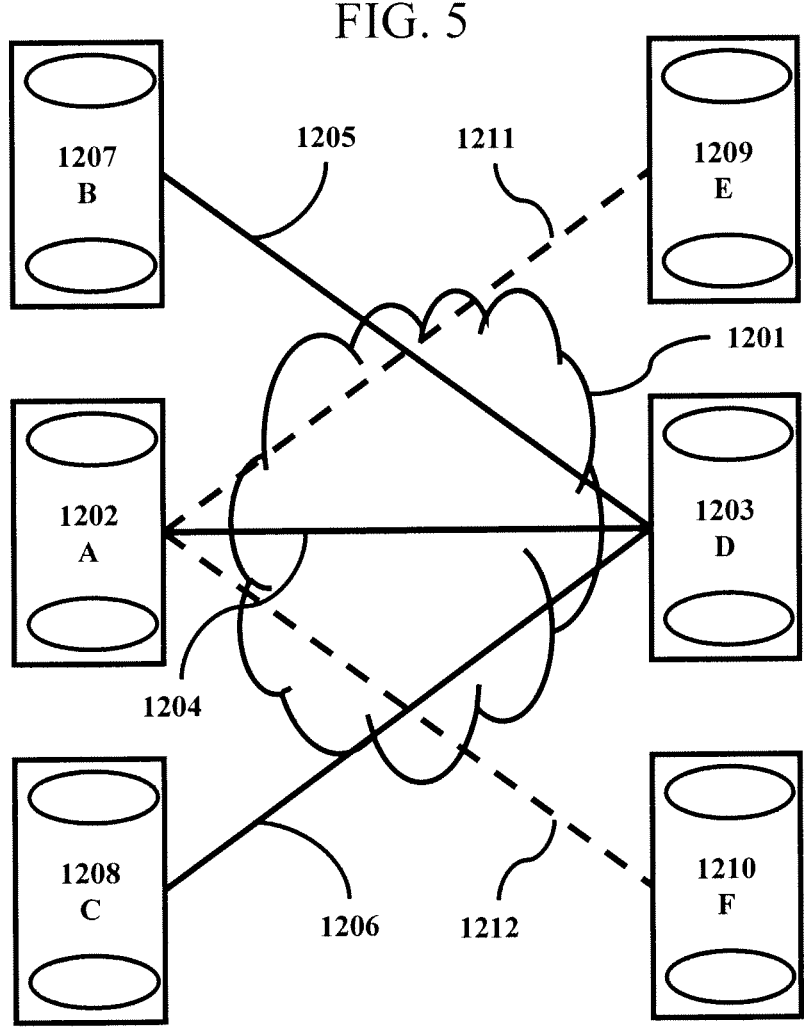
FIG. 5 illustrates an example embodiment considering average loss.

In the example of FIG. 5, the $ALNE_x$ calculated at the intercepting network device A 1202 represents the average of the current loss ratio received from intercepting network devices D 1203, E 1209 and F 1210.

If the difference between the current loss ratio for the session and the $ALFE_x$ is below a predetermined threshold, the current loss ratio is used to set the encoding level, as described above. In this case, it is assumed that it is unlikely that the sessions are congesting the upstream network since the current loss ratio is better, or slightly worse than, the computed $ALFE_x$.

If the difference between the current loss ratio and the $ALFE_x$ is greater or equal to a predetermined threshold AND the current loss ratio minus the $ALNE_x$ is greater than or equal to a predetermined threshold, then the current loss ratio is ignored, and the encoding levels are set according to the packet size table only to minimize bandwidth usage by choosing the most bandwidth-efficient encoding method for the given packet. The predetermined thresholds could be different and set according to network policies and topology.

Irrespective of how n is determined (current loss or average loss), the increase in the value of n can be performed gradually to avoid a big step in the increase of overhead. When a higher value of n is recommended by the table, it can be applied to only a subset of the subsequent standard packets: only v standard packets out of the next incoming w standard packets use the increased value of n, while the other w-v packets use the previous lower value for n. The values of v and w can also change if the measured loss ratio continues to increase or as the measured loss ratio approaches the next level.

For example, if the measured loss (weighted or normalized) is 0%, then n=1, m=0 and v=w=1. Therefore all packets are encoded with n=1, m=0. If the measured loss increase to greater than 0% but lower than 0.05%, then n=4, m=1, but v=1 and w=3, such that only one out of three packets is encoded with n=4, while the others use the previous encoding level n=1, m=0. When the measured loss exceeds 0.05% but is below 0.1%, then change to v=1 and w=2, such that every second packet is encoded with n=4, while the others use the previous encoding level n=1, m=0. When the measured loss exceeds 0.1% but is below or equal to 0.2%, then use v=1 and w=1, such that every packet is encoded with n=4. Different values of v and w can be configured to smooth out the overhead increase at different predetermined loss ratios. This capability can significantly smooth out the transfer function between different loss ratios.

Intercepting network devices operate on the theory that network loss will decrease as the encoding level is increased. However, as n and/or m are increased, the number of packets generated by the intercepting network devices and, traversing the network, is increased. This results in an increase in the bandwidth required to achieve application communication.

The additional bandwidth may in some circumstances lead to an increase in loss. If one or more links in the path are bandwidth constrained, the additional packets actually increase congestion at this point. When a packet arrives at a link for transmission, it may or may not be able to be transmitted immediately. If the packet cannot be sent, most devices implement a queue to buffer the packet so that it can be transmitted later. In some devices, as the queues associated with this link grow to a particular level, a network congestion control mechanism (e.g., RED, WRED, etc.) may be invoked to handle the congestion on this link As the number of packets arriving at this link is increased, the likelihood of one of the encoded packets being discarded is increased. The probability is also increased due to the additional overhead added by the encoding channel. The additional overhead increases the depth of the queue more quickly thus increasing the likelihood that a packet will be discarded.

Another cause of congestion can be switching context. A network device in the path between the source end-station and the destination end-station may only be able to forward a limited number of packets per period of time. Therefore, even though enough link bandwidth is available to transport the encoded packets, the network device cannot forward all the frames, leading to loss.

Therefore, by increasing the encoding level which increases the number of packets in the path and the amount of overhead, the loss ratio may increase. The intercepting network device requires an algorithm to react to this situation. First, the intercepting device needs to detect a significant increase in loss ratio on an encoding channel. This can be done, for example, by tracking the results of the loss ratio over a period of time. This can be the current loss ratio as calculated by equation (1) or (2), the weighted loss ratio calculated by equation (3) or (4), the normalized loss ratio calculated by equation (5), or any other method to obtain loss.

One method of detecting a significant increase is to use the instantaneous change in the loss ratio. This looks at the difference between the current loss ratio and the previous loss ratio'.

$$\Delta CLR_x = CLR_x - CLR_{x-1} \quad (8)$$

If this difference exceeds a significant increase threshold, defined as SIT, then a significant increase in loss ratio is detected. To avoid spuriously declaring that a significant increase has occurred, the number of encoded packets sent between the source intercepting network device and the destination intercepting network device must be statistically relevant. This is captured in the case equation below:

$$\text{significant increase} = \begin{cases} \text{true if packets} \geq \text{minimum} \\ \text{relevant and } \Delta CLR_x \geq SIT \\ \text{false if packets} < \text{minimum relevant} \end{cases} \quad (9)$$

Instead of using an instantaneous ratio, the previous equations can use the average loss ratio (like equations (3) and (4)). The change can be calculated using equation (10):

$$\Delta WL_x = WL_x - WL_{x-1} \quad (10)$$

Then the significant increase can be determined as follows:

$$\text{significant increase} = \begin{cases} \text{true if } \Delta WL_x \geq SIT \\ \text{false if } \Delta WL_x < SIT \end{cases} \quad (11)$$

Another approach is to record the loss ratio when an increase is the encoding level is enacted. The change in loss ratio ($CLR_{original}$) is recorded and used as the basis of comparison to the current instantaneous loss ratio. If the current loss ratio is, for example, ten times the original loss ratio, a significant increase in loss has been detected:

$$\text{significant increase} = \begin{cases} \text{true if } CLR_x \geq 10 \times CLR_{original} \\ \text{false if } CLR_x < 10 \times CLR_{original} \end{cases} \quad (12)$$

Figure 6:
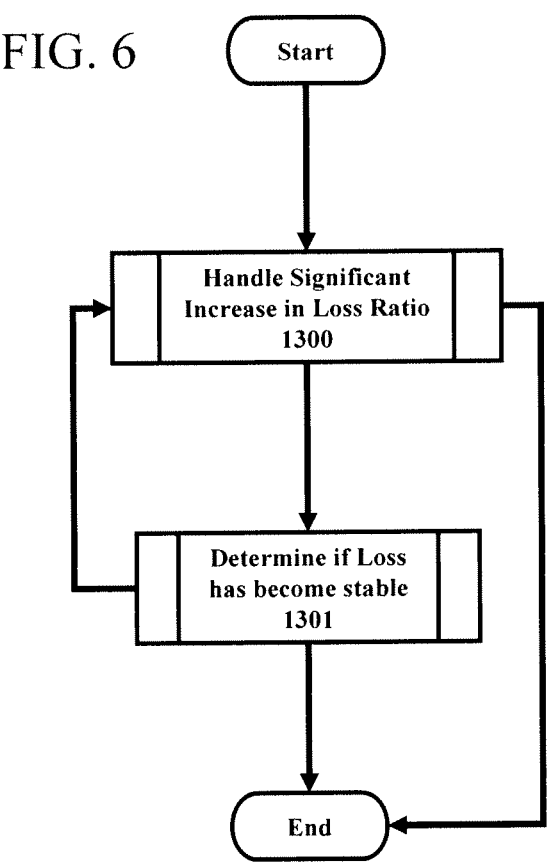
FIG. 6 illustrates an example of encoding level back-off.

Once a significant increase in the loss ratio has been detected, the intercepting network device reacts using an encoding level back-off scheme. In this case, the intercepting network device reacts to loss by decreasing the encoding level instead of increasing it. FIG. 6 is a flow chart of one technique for decreasing the encoding level in response to the detection of a significant increase in the loss ratio. First, step 1300 attempts to find an encoding level that stops the increase in loss ratio. Once this level is achieved, step 1301 ensures that the loss ratio is stable before returning the intercepting network device to normal processing of loss ratio.

Figure 7:
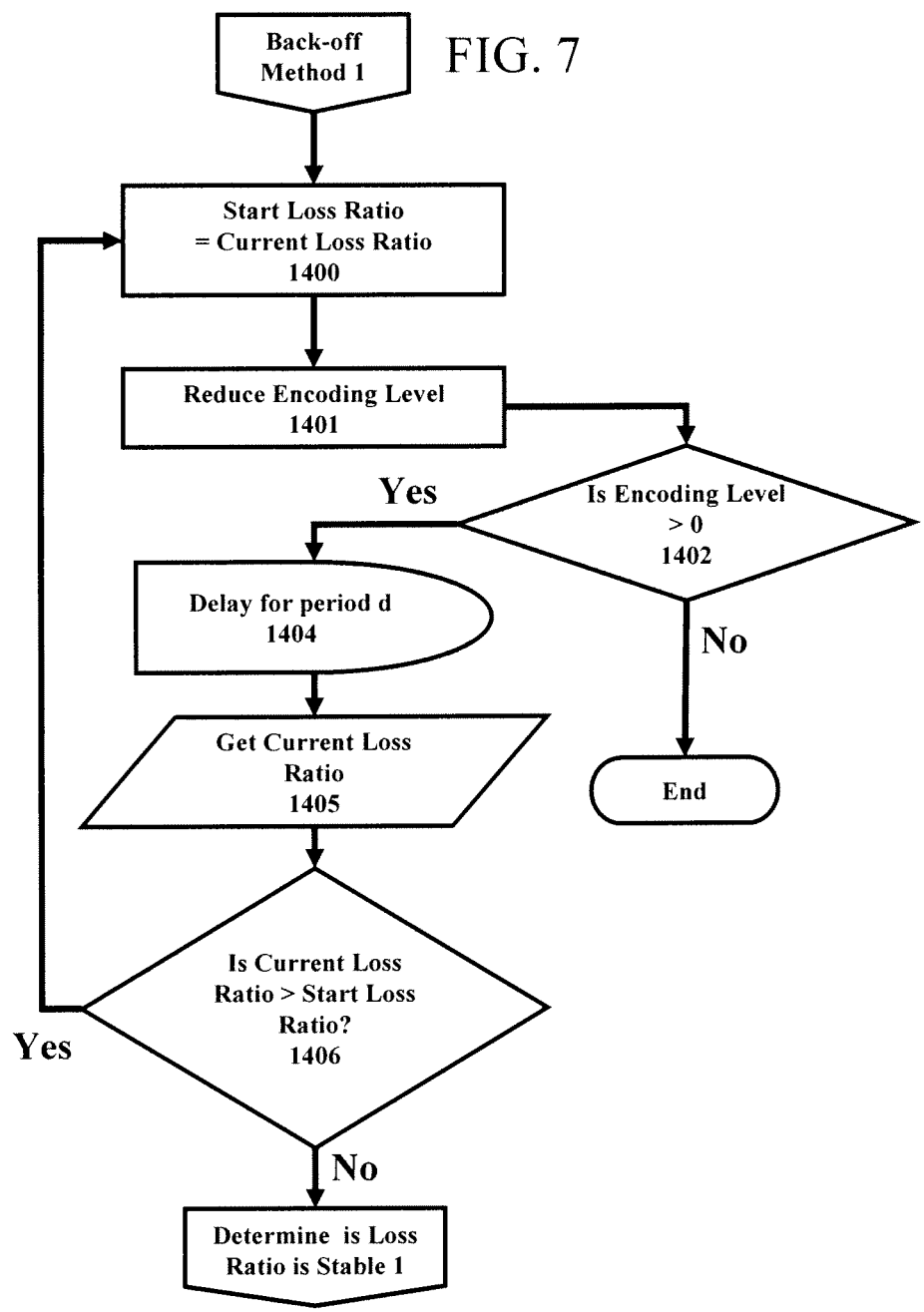
FIG. 7 is a flow chart illustrating the steps executed when a significant increase in loss is detected and encoding level back-off is enabled.

FIG. 7 depicts one implementation of step 1300 in FIG. 6. This algorithm defines the steps to find an encoding level that stops the increase in loss ratio. The algorithm starts by recording the current loss ratio at step 1400, and then the encoding level of the channel is reduced at step 1401. The reduction of the encoding level can be effected in several ways. For example, the encoding level can be reduced linearly for each iteration of the algorithm, or it can be decreased exponentially. One implementation supports both methods and allows one of the methods to be selected when the encoding channel is established. Another example uses a configuration policy that is set before the encoding channel is created.

Once the encoding level has been reduced at step 1401, step 1402 determines whether the encoding level is greater than zero. A negative answer at step 1402 indicates that the current loss ratio is still higher than the starting loss ratio, which indicates that the encoding back-off algorithm is not working, and thus the algorithm is terminated at step 1403. The encoding channel then returns to normal loss ratio processing or reverts to n=1 and m=0 and notifies the user and/or the system.

If the answer at step 1402 is affirmative, the system advances to step 1404 where the intercepting network device waits for a period of time d before sampling the current loss ratio again at step 1405. Step 1406 then determines whether the current loss ratio is greater than the starting loss ratio at step 1406, i.e., the loss ratio is still increasing by some predetermined amount, the algorithm returns from step 1406 to steps 1401 and 1402 to reduce the encoding level for the channel again. If the answer at step 1406 is negative, the system proceeds to step 1407 to determine if the current encoding level results in a stable loss ratio.

Figure 8:
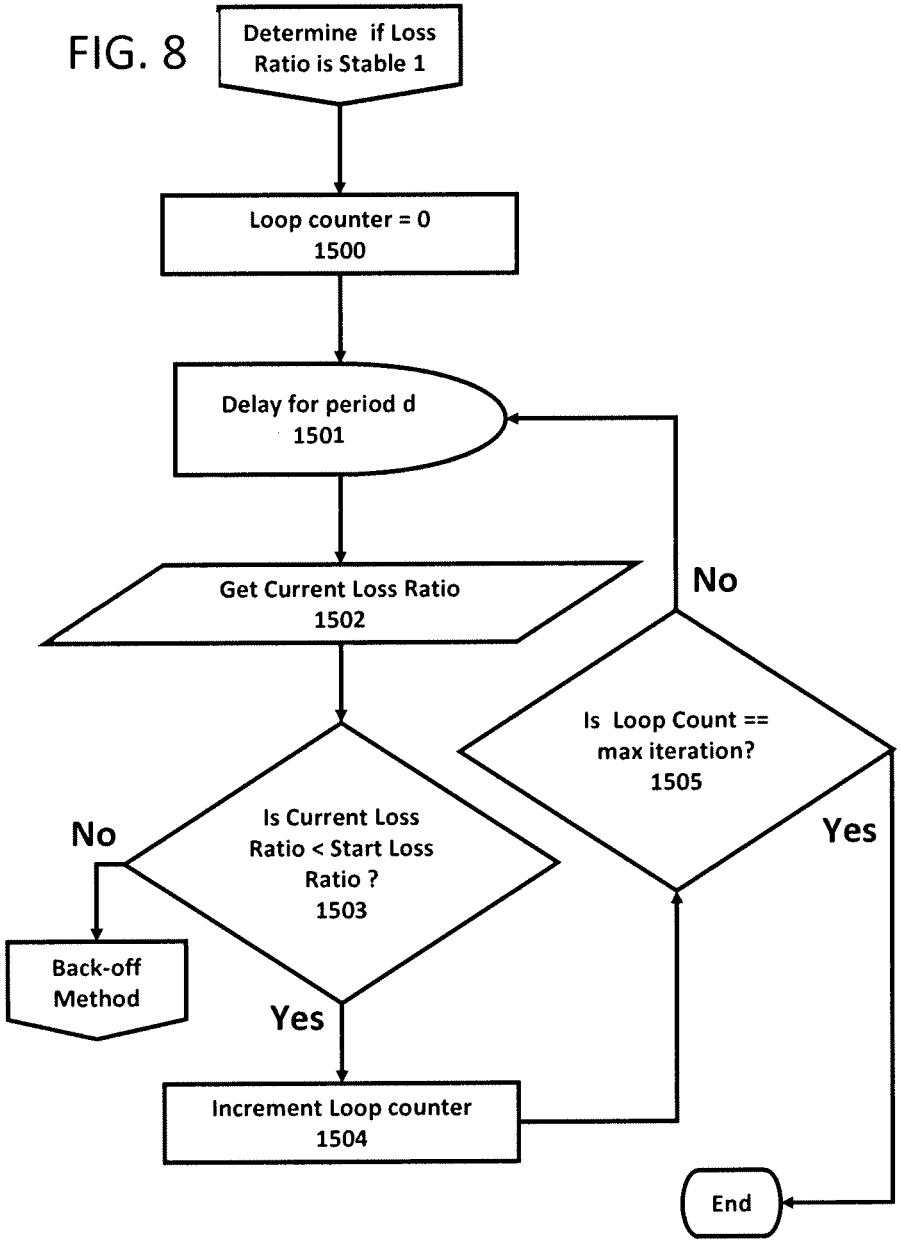
FIG. 8 is a flow chart illustrating the steps executed to detect loss ratio stabilization after encoding level back-off is enabled.

FIG. 8 depicts one implementation of step 1301 in FIG. 6. This algorithm defines the steps to determine if the current encoding level has resulted in a stable loss ratio. The algorithm runs in a loop which is initialized in step 1500. The intercepting network device then waits for a period d at step 1501 before sampling the current loss ratio again at step 1502. If the current loss ratio is significantly greater than the start loss ratio, the algorithm exits and returns to backing off the encoding level at step 1503. Step 1503 determines whether the current loss ratio remains below the starting loss ratio (step 1503), then the algorithm increments the loop counter (step 1504) and continues to sample the current loss ratio until the maximum number of iterations has been reached (step 1505). At this point, the algorithm exits since the significant increase in loss ratio has been handled.

Figure 9:
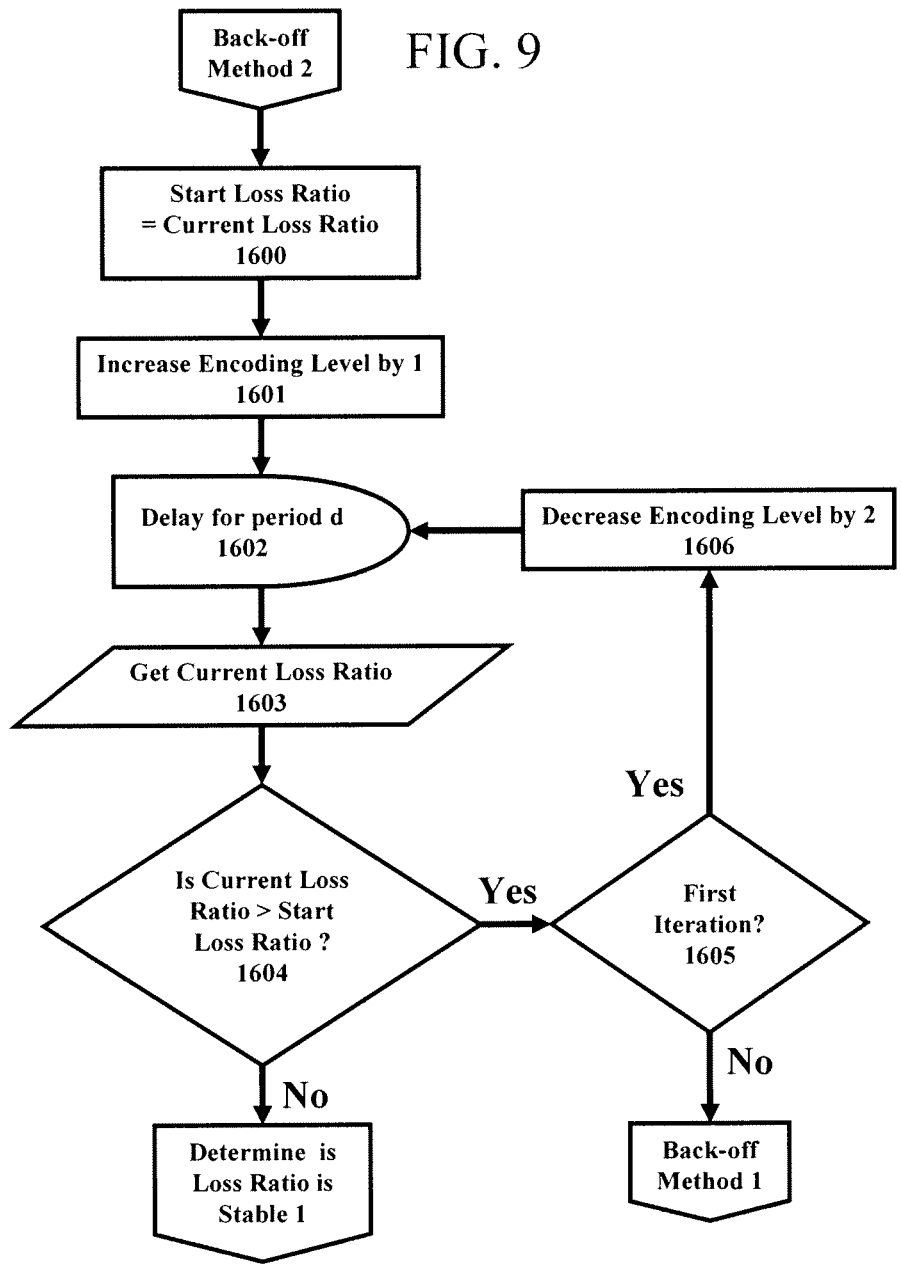
FIG. 9 is a flow chart illustrating an alternate algorithm which is executed when a significant increase in loss is detected and encoding level back-off is enabled.

There are other implementations of the algorithm of FIG. 6. For example, FIG. 9 depicts an alternate implementation of the encoding level back-off scheme. In this case, the algorithm sets the starting loss ratio to the current loss ratio value at step 1600, and then step 1601 initially increases the encoding level to determine whether the loss ratio will be reduced. If step 1604 detects a reduction in the loss ratio, the algorithm exits and proceeds to ensure that the loss ratio is stable before returning to normal loss ratio processing. If step 1604 does not detect a reduction in the loss ratio, the algorithm proceeds to steps 1605 and 1606 to reduce the encoding level by 2 levels, and then to step 1602 to wait for a period before checking the current loss ratio again. If this succeeds (steps 1603 and 1604), again the algorithm ensures that the loss ratio is stable before returning to normal loss ratio processing. If step 1604 determines that the current loss ratio is still greater than the starting loss ratio and step 1605 determines this is not the first iteration, then the algorithm continues backing off the encoding level using the algorithm of FIG. 7.

Figure 10:
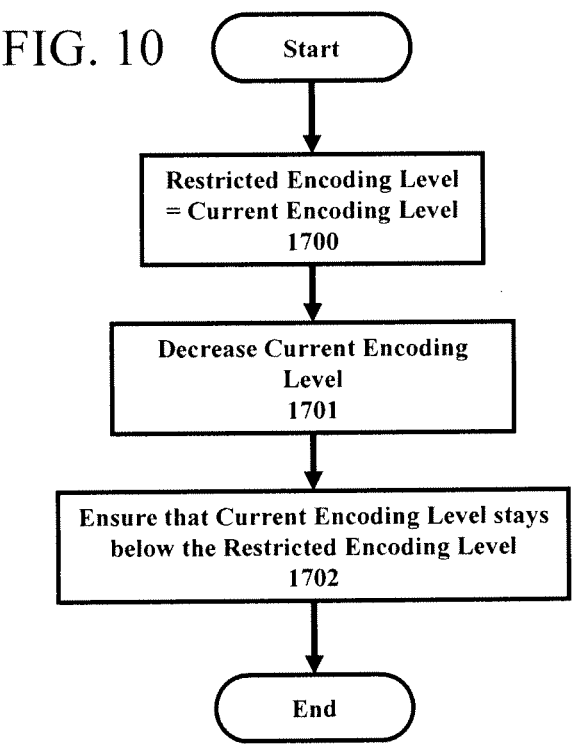
FIG. 10 is a flow chart of an example of restricting an encoding level due to burst loss.

Another approach to handling a significant increase in loss ratio (in step 1300 of FIG. 6) is to restrict the encoding level that is causing the significant increase, using the algorithm of FIG. 10. In step 1700, the current encoding level is recorded as the restricted encoding level, and then the current encoding level is reduced at step 1701. Then step 1702 ensures that the current encoding level remains below the restricted encoding level.

Figure 11:
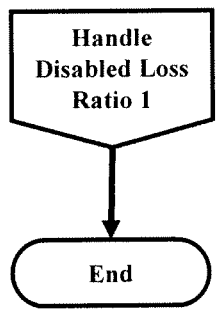
FIG. 11 is a flow chart of an example of handling a restricted encoding level for the remaining time the encoding channel remains open.
Figure 12:
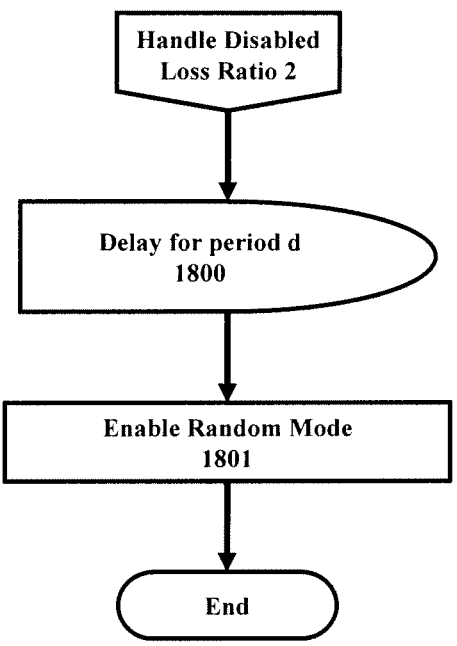
FIG. 12 is a flow chart of an example of handling a restricted encoding level for a period of time d.
Figure 13:
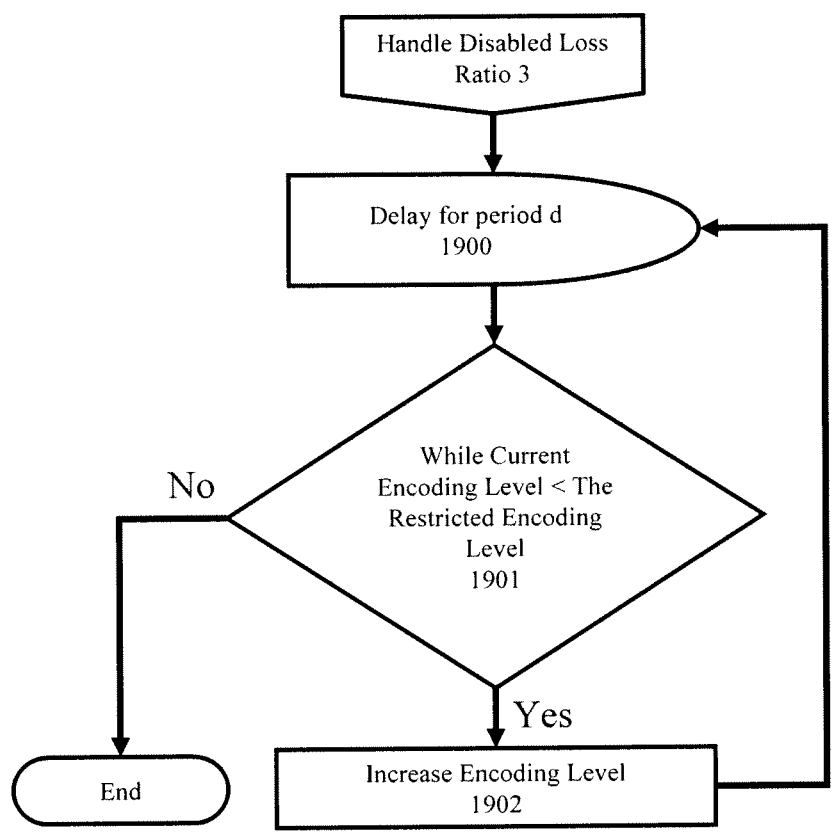
FIG. 13 is a flow chart of an example of handling a restricted encoding level. In this case, the encoding level is increase over a period of time to match the restricted encoding level.

There are a number of ways to determine whether the restriction of the encoding level stabilizes the loss ratio, in step 1301 of FIG. 6. One way depicted in FIG. 11 is to simply exit the algorithm so that the encoding level is never used again while the encoding channel is active. FIG. 12 depicts an alternative technique that delays for a period of time d at step 1800 before re-enabling the encoding level for the encoding channel at step 1801. FIG. 13 depicts another alternative in which the encoding level is slowly adjusted back to the restricted encoding level. The period of time over which this occurs depends upon the delay period d set in step 1900, and the increment used to increase the encoding level in step 1902. Step 1901 compares the current encoding level with the restricted encoding level to determine whether the current encoding level is less than the restricted coding level. As long as the answer is affirmative, the system advances to stop 1902 to increases the coding level. Once the restricted level is achieved, the algorithm exits at step 1903.

Figure 14:
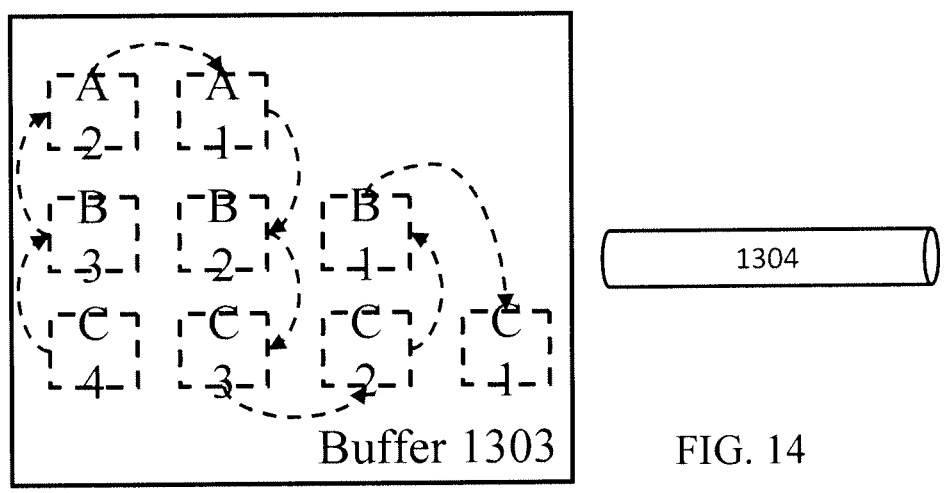
FIG. 14 is a flow chart of an example of interleaved mode according to an embodiment of the present invention.

Another strategy for handling a high level of network loss is to configure the encoder to transmit encoded packets in an interleaved manner (referred to as "interleaved mode"), thereby spreading the risk of losing multiple encoded packets across different standard packets and providing a higher probability of encoded packet re-assembly. Thus, instead of sequentially sending groups of encoded packets such that each group corresponds to a single standard packet, encoded packets from different standard packets are interleaved with one another. FIG. 14 illustrates an example of the interleaving mode. In this example, it is assumed that standard packets A, B, and C are respectively segmented into encoded packets A1, A2; B1, B2, B3; and C1, C2, C3 and C4. Encoded packets A2, B3 and C4 are extra encoded packets. Instead of sending these encoded packets grouped according to their respective standard packets, they are interleaved by groups of k standard packets. In the example of FIG. 14, k=3. The encoder stores the encoded packets corresponding to k standard packets into a buffer 1303. Alternatively, the encoder stores a number of packets that arrive during a predetermined time period or until a packet with time sensitive information is detected (e.g., via deep packet inspection). To avoid reordering, the set of encoded packets is aligned to the left such that the last second data of each standard packet is at the tail and is sent last, and the first encoded packet of each standard packet is at the head and is transmitted first. The encoder transmits on the physical interface 1304 the data units at the head in order of top to bottom, or any order that minimizes sending two consecutive encoded packets from the same standard packet. In the example of FIG. 14, the encoded packets can be sent in the order C1, B1, C2, A1, B2, C3, A2, B3, and C4. Sending all the extra encoded packets last can minimize delay. The interleaving can also be done randomly. The group of packets to interleave can include all the encoded packets transmitted from the interface, or the interleaving group can include encoded packets of the same application (e.g., same channels of a video conference), the same destination or a preconfigured grouping.

Figure 15:
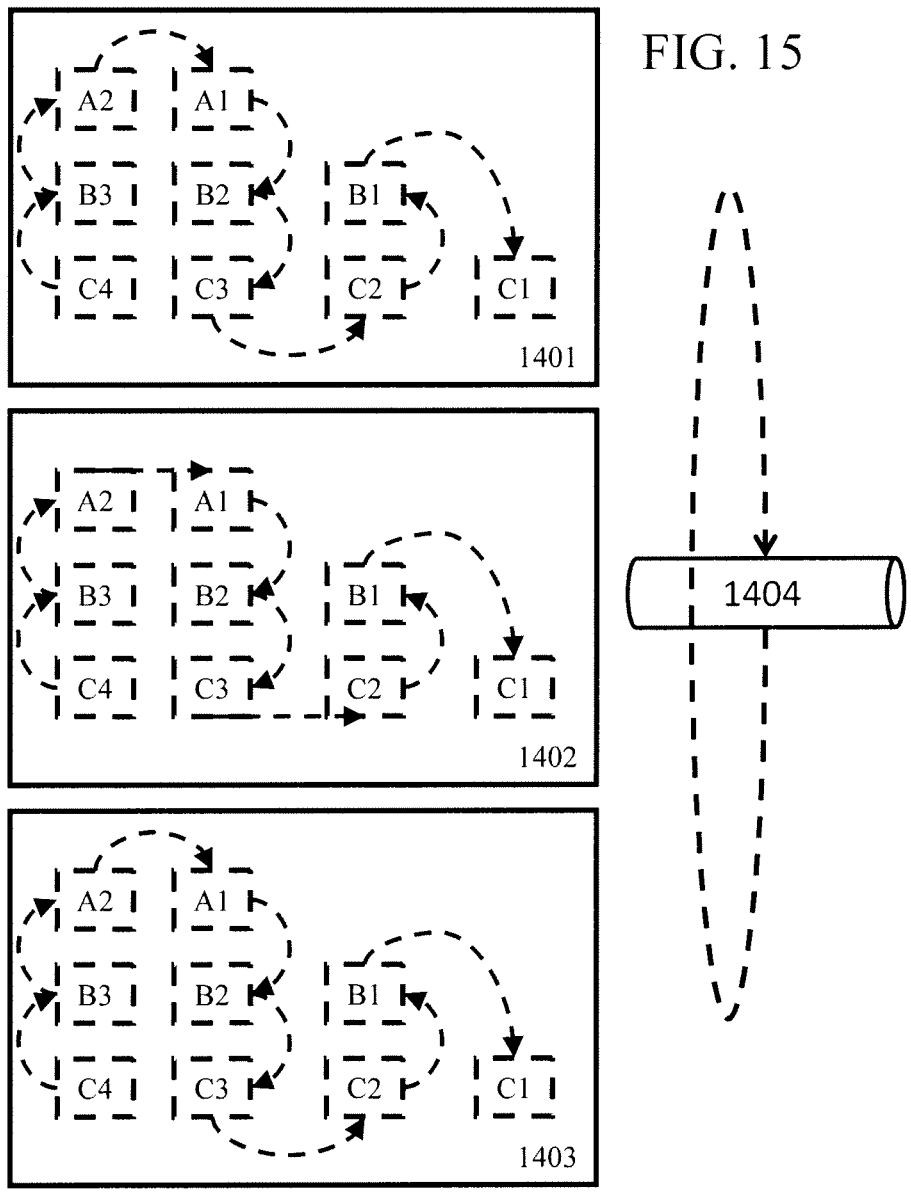
FIG. 15 is a flow chart of an example of multi-level interleaved mode according to an embodiment of the present invention.

In FIG. 15, another level of interleaving is achieved, by interleaving the encoded packets of different interleaved groups 1401, 1402, 1403 of interleaved encoded packets. By such interleaving, the impact of any large loss of data units can be minimized, and, depending on the coding and strategy employed, this type of loss may be recoverable.

Figure 16:
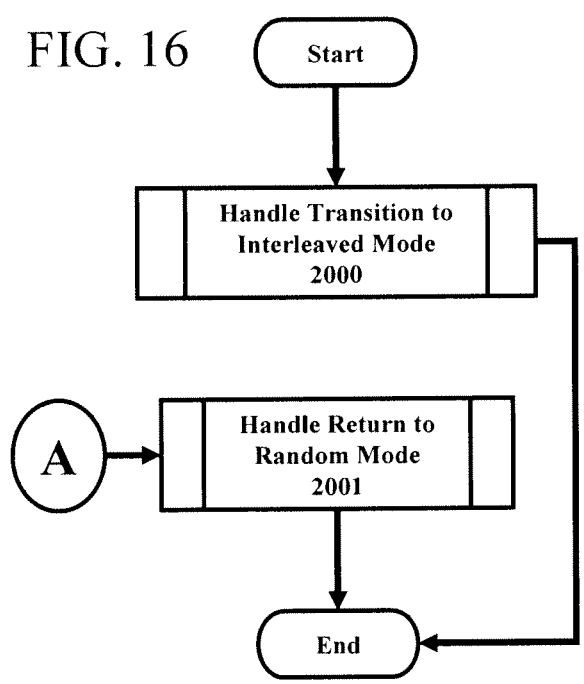
FIG. 16 is a flow chart illustrating the steps executed when the intercepting network device is handling burst loss.

The "interleaved mode" can also be used to address burst loss. Burst loss can be detected if the current loss ratio (i.e., the result of equation (1), (2), (3) or (4)) exceeds the Target Loss Ratio by a predetermined amount (e.g., double). One technique for handling burst loss is illustrated in FIG. 16. When burst loss is initially detected, the loss ratio is debounced. Assuming that the burst loss persists, then a transition to the interleaved mode is executed at step 2000. If the interleaved mode is enabled, the conditions to return to the random mode are checked and verified at step 2001.

Figure 17:
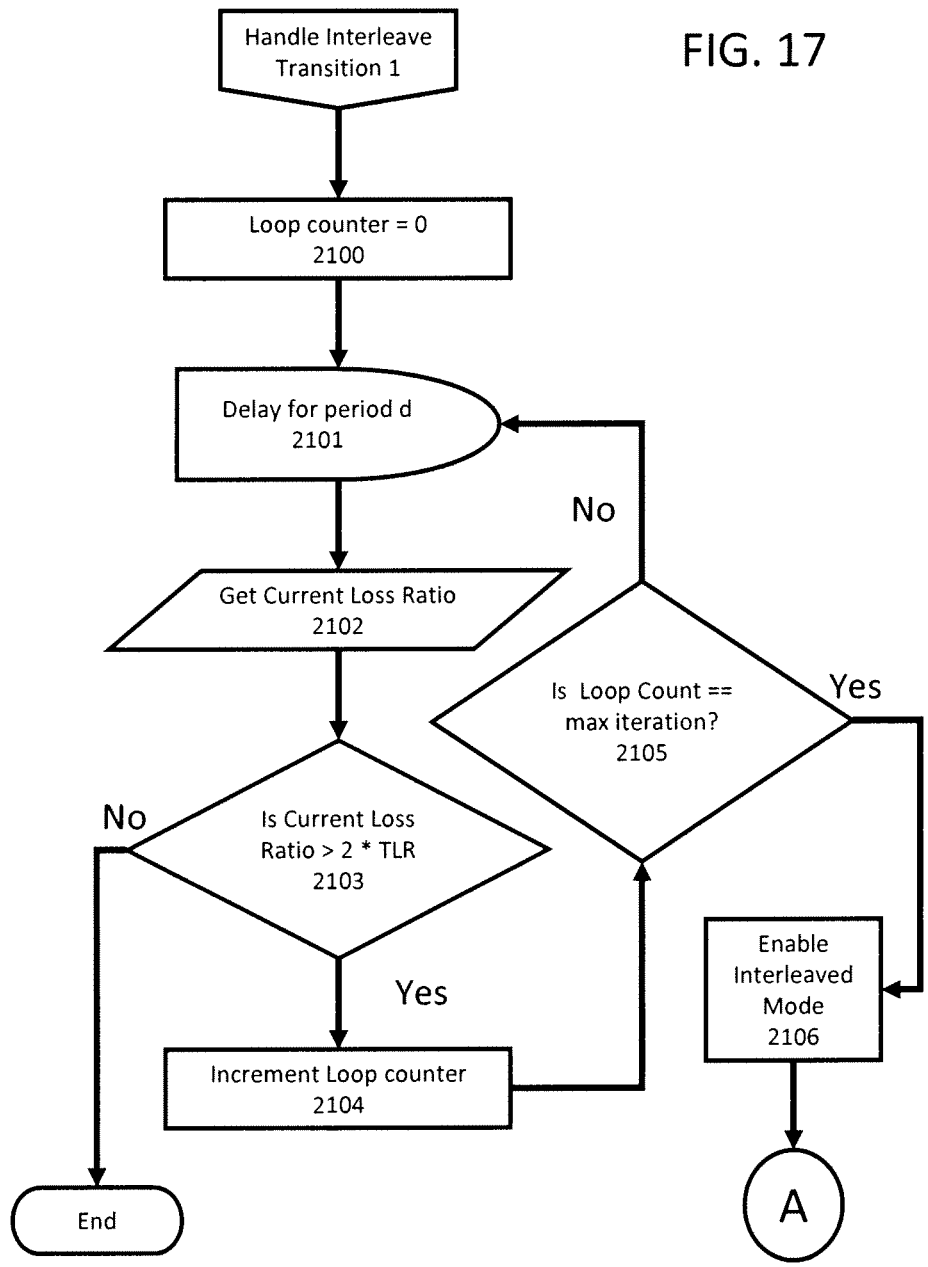
FIG. 17 is a flow chart illustrating the steps executed when the intercepting network device is handling burst loss and interleaved mode is enabled.

An example of how to transition to the interleaved mode is illustrated in FIG. 17. This algorithm debounces the current loss ratio to ensure that the issue persists before enabling interleaved mode. The implementation uses a loop that is initialized at step 2100 and then delays for a time period of d at step 2101. The current loss ratio is retrieved at step 2102 and checked at step 2103 to determine whether the current loss ratio exceeds twice the Target Loss Ratio, which is acceptable for this standard protocol type. An affirmative answer at step 2103 causes the loop counter to be incremented at step 2104, and then step 2105 determines whether the loop count has reached the maximum iteration. If the answer is negative, the system returns to step 2101 and repeats steps 2102 and 2103. A negative answer at step 2103 ends the routine, and an affirmative answer at step 2105 causes the interleaved mode to be enabled at step 2106.

Thus, assuming that the loss ratio is maintained for delay period d times the max iterations, the queuing is set to the interleaving mode, and the algorithm continues on to handle the return to the random mode. If the loss ratio does not continue to exceed twice the TLR for the application, the algorithm exits and the interleaved mode is disabled.

Returning to the random mode can be implemented by any of several different methods illustrated in FIGS. 18-21. The method actually used for an encoding channel can be selected in several ways. The intercepting network device may be configured with the method to use for all encoding channels. Also, the intercepting network device may have a policy that matches the standard protocol being encoded. Alternatively, the intercepting network devices may negotiate the method to be used when the encoding channel is established.

Figure 18:
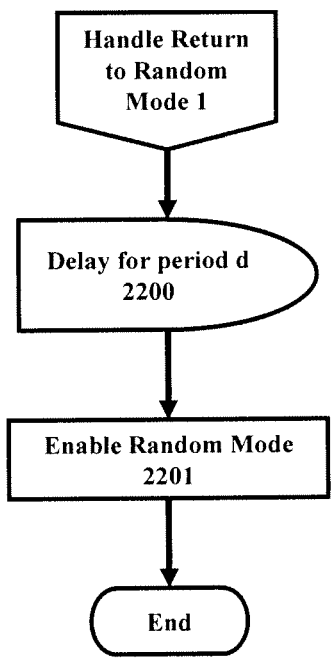
FIG. 18 is a flow chart illustrating the steps executed when the intercepting network device is leaving interleaved mode and random mode is enabled.

FIG. 18 illustrates the most straightforward method for returning to the random mode. In this case, a timer is started at step 2200 when the encoded channel has entered the interleaved mode. When the timer expires, the channel returns to the random mode at step 2201.

Figure 19:
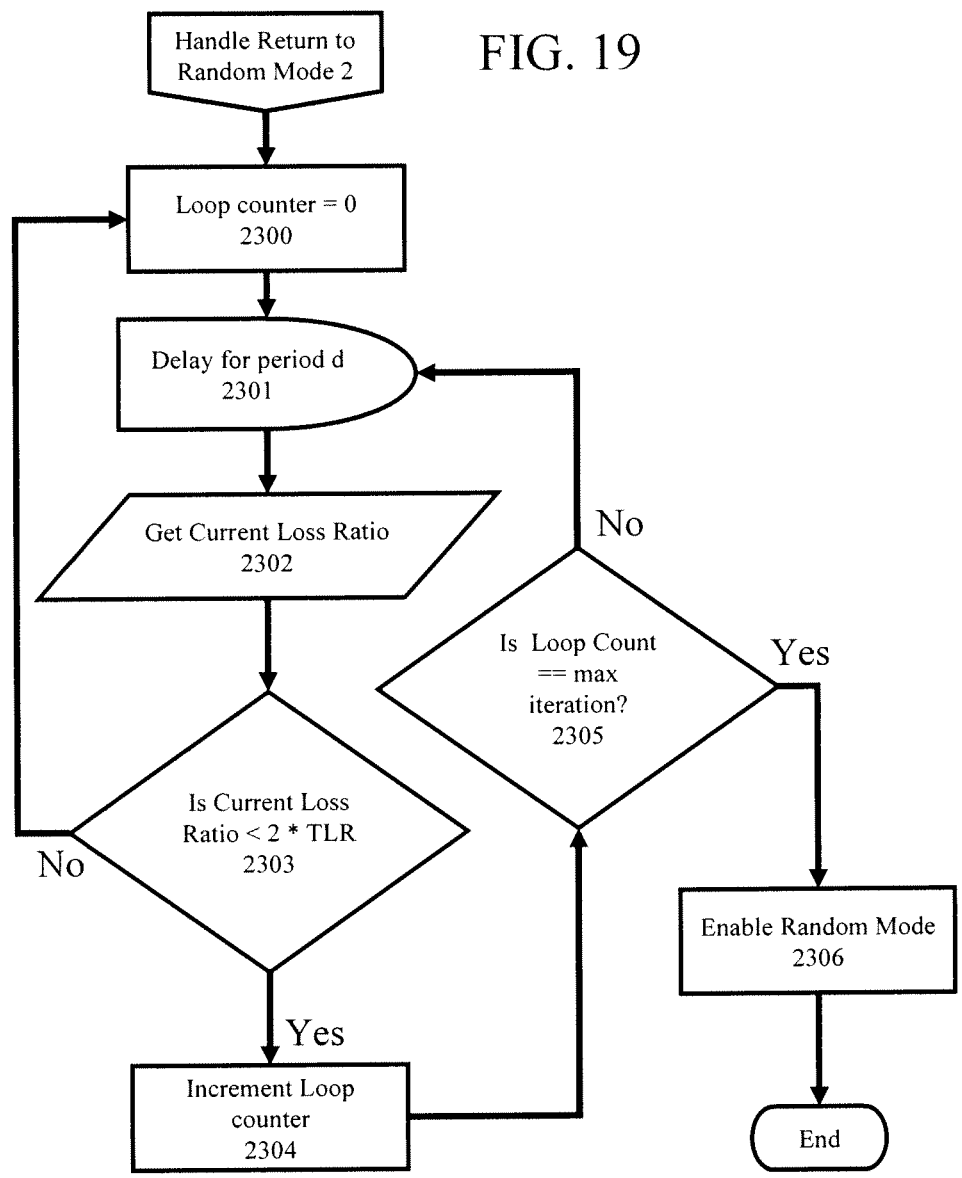
FIG. 19 is a flow chart illustrating an alternate algorithm which is executed when the intercepting network device is leaving interleaved mode and random mode is enabled.

In FIG. 19, the algorithm ensures that the interleaved mode has an effect on the current loss ratio before queuing is returned to the random mode. The current loss ratio must be lower than twice the Target Loss Ratio for a time period of d times the max iterations before the random mode is enabled. To complete this, a loop is used to sample the current loss ratio. The loop is initialized at step 2300 and then waits for a delay period of d at step 2301. The current loss ratio is retrieved at step 2302 and checked at step 2303 to determine whether the current loss ratio exceeds twice the Target Loss Ratio. An affirmative answer at step 2303 causes the loop counter to be incremented at step 2304, and then step 2305 determines whether the loop count has reached the maximum iteration. If the answer is negative, the system returns to step 2301 and repeats steps 2302 and 2303. An affirmative answer at step 2305 causes the random mode to be enabled at step 2306.

Figure 20:
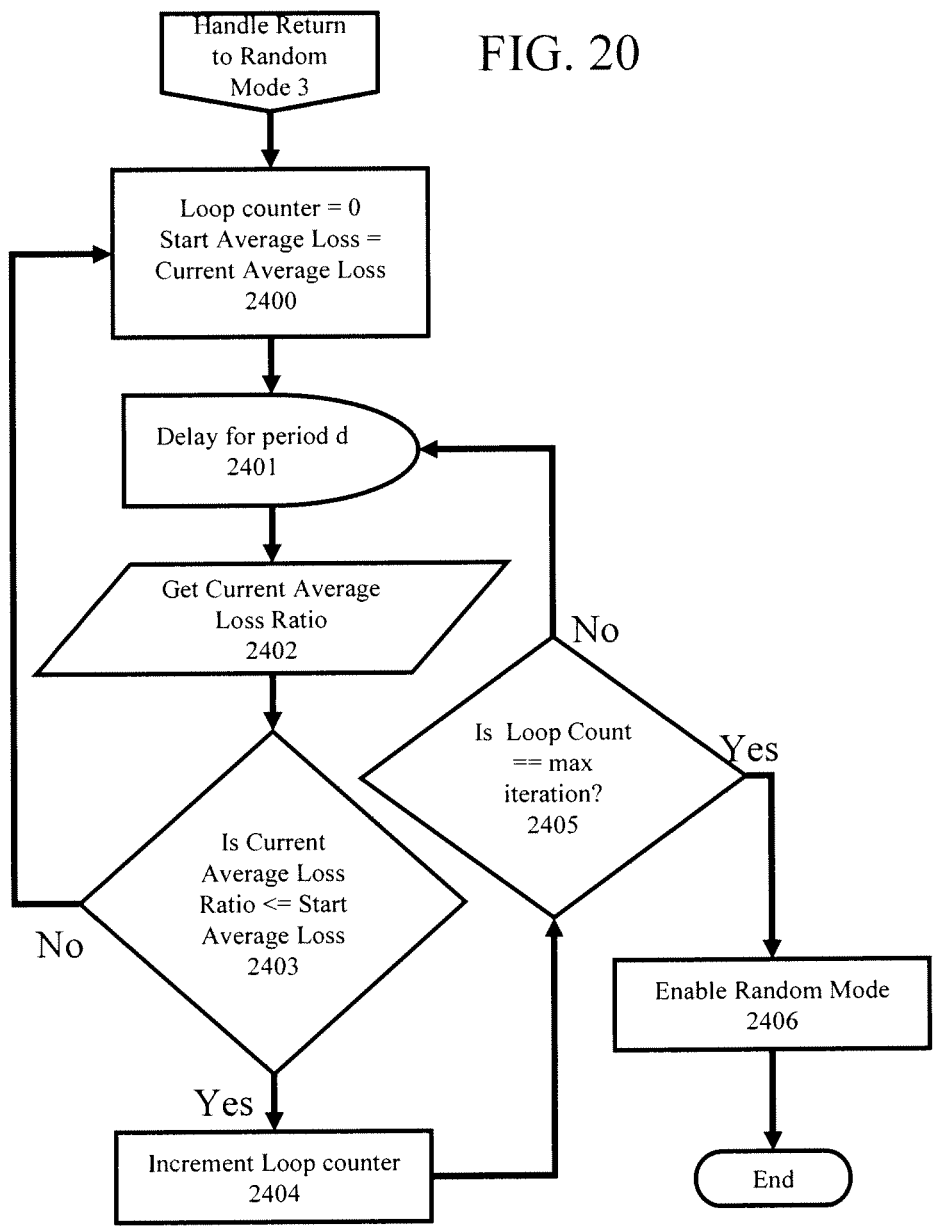
FIG. 20 is a flow chart illustrating another alternate algorithm which is executed when the intercepting network device is leaving interleaved mode and random mode is enabled.

FIG. 20 is similar to FIG. 19 with the exception that instead of using the current loss ratio, the average loss ratio is used. The loop is initialized at step 2400 by setting the loop counter to zero and setting the Start Average Loss to the Current Average Loss and, the system then waits for a delay period of d at step 2401. The current average loss ratio is retrieved at step 2402 and checked at step 2403 to determine whether the current average loss ratio exceeds the Start Average Loss. An affirmative answer at step 2403 causes the loop counter to be incremented at step 2404, and then step 2405 determines whether the loop count has reached the maximum iteration. If the answer is negative, the system returns to step 2401 and repeats steps 2402 and 2403. An affirmative answer at step 2405 causes the random mode to be enabled at step 2406.

Figure 21:
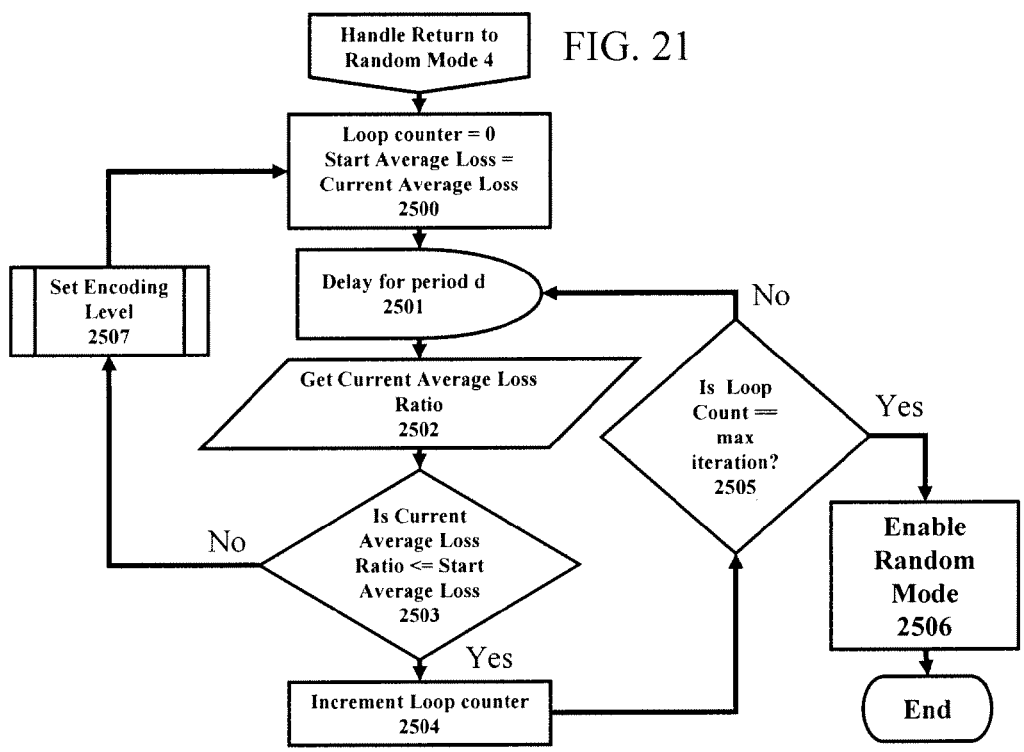
FIG. 21 is a flow chart illustrating another alternate algorithm which is executed when the intercepting network device is leaving interleaved mode and random mode is enabled.

FIG. 21 is similar to FIG. 20, except that changing the encoding level is also allowed. The loop is initialized in step 2500 by setting the loop counter to zero and setting the Start Average Loss to the Current Average Loss and, the system then waits for a delay period of d at step 2501. The current average loss ratio is retrieved at step 2502 and checked at step 2503 to determine whether the current average loss ratio exceeds the Start Average Loss. A negative answer at step 2503 adjusts the encoding level at step 25607 to handle the current average loss ratio and then returns to step 2500. An affirmative answer at step 2503 causes the loop counter to be incremented at step 2504, and then step 2505 determines whether the loop count has reached the maximum iteration. If the answer is negative, the system returns to step 2501 and repeats steps 2501-2503. An affirmative answer at step 2505 causes the random mode to be enabled at step 2506.

Figure 22:
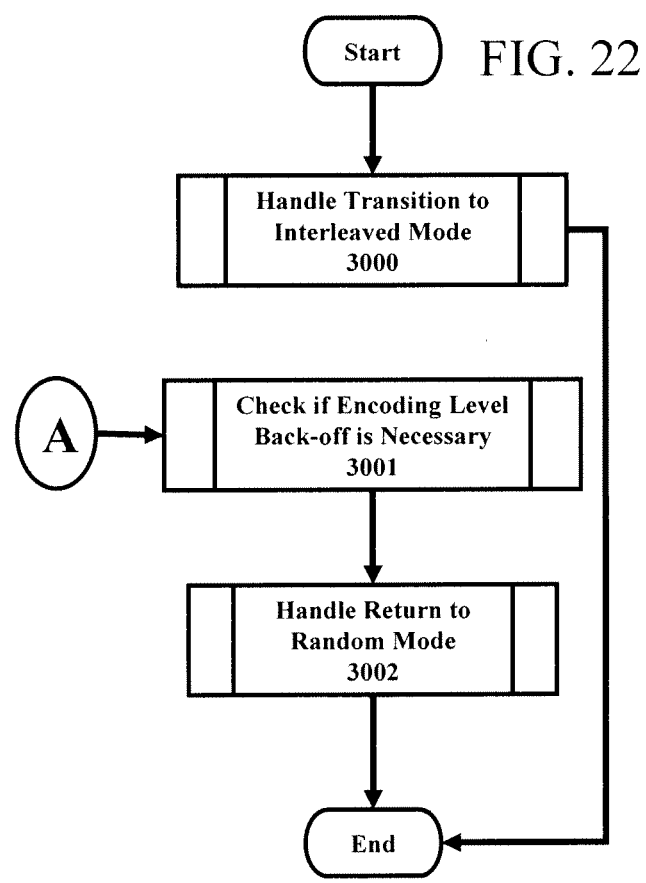
FIG. 22 is a flow chart illustrating the steps executed when the intercepting network device is handling burst loss using interleaved mode and encoding level back-off.

FIG. 22 illustrates an algorithm that combines the handling of both significant changes in the current loss ratio or burst loss exceeding twice the TLR. In this embodiment, the algorithm starts at step 3000 by determining if the encoding channel needs to transition to the interleaved mode. Assuming this is required, the algorithm then checks to see if encoder level back-off is required at step 3001. Regardless of whether back-off is required, the algorithm then determines when the encoding channel transitions back to the random mode at step 3002.

Handling the transition to the interleaved mode in step 3000 can be handled in the same way as in FIG. 18. Step 3002 looks at the transition back to the random mode, using any of the algorithms illustrated in FIGS. 18-21.

Figure 23:
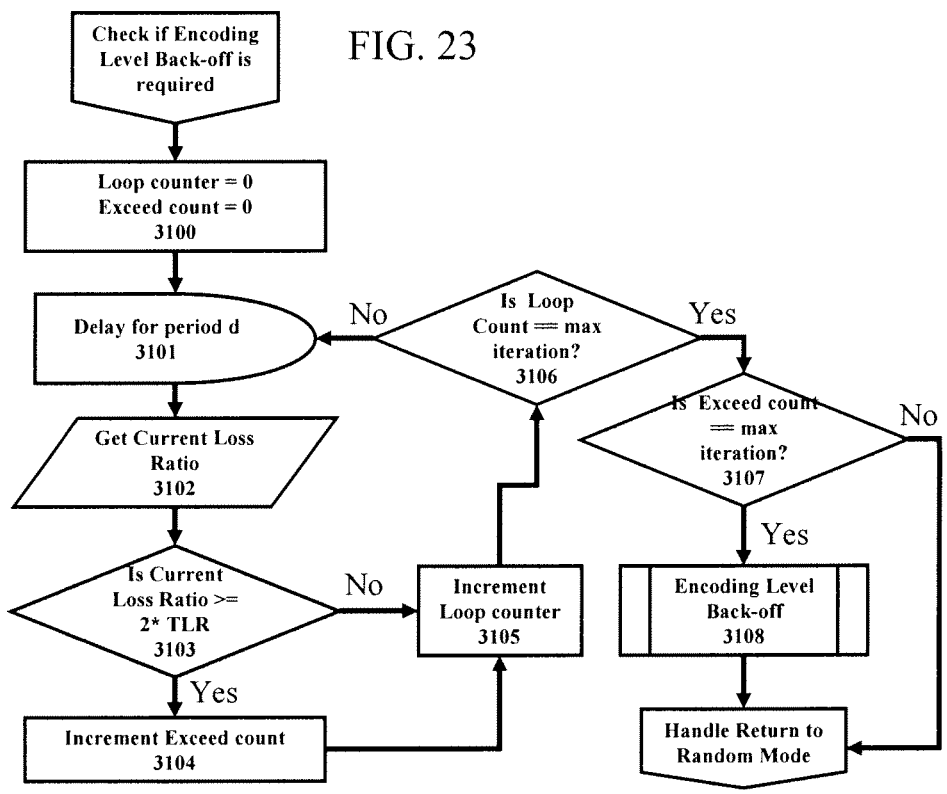
FIG. 23 is a flow chart illustrating the steps to determine if encoding level back-off is required when handling burst loss.

Determining whether back-off is required at step 3002 is illustrated in FIG. 23. This algorithm debounces the effect of transitioning from the random to the interleaved mode. This measurement should be done after an increase in encoding level. It loops for a period of delay d times max iterations and checks the current loss ratio. The loop, initialized at step 3100, has a delay period of d at step 3101. When this dely period expires, the current loss ratio is sampled at step 3102 and compared to twice the TLR at step 3103. If the current loss ratio is greater than twice the TLR, the exceed counter is incremented at step 3104. Otherwise, the loop counter is incremented at step 3105. This process continues until the loop counter reaches max iterations at step 2506. At this point, the exceed counter is checked at step 2507, and if it equals max iterations, encoding level back-off is enabled at step 2508. Otherwise, the algorithm proceeds on to handle the return to the random mode.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be implemented in a network having endpoints, such as servers or other computing devices, and associated encoding components. The encoding components, and the described methods, can be implemented in hardware, software or a combination thereof. Those portions that are implemented in software can be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method. Those of ordinary skill in the art will appreciate that other instructions and operations necessary to implement the described embodiments may also be stored on the machine-readable medium. Software running from the machine readable medium may interface with circuitry to perform the described tasks.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. A method of forwarding data transmissions from a first network to a third network via a second network, the method comprising
receiving packets of a first type from said first network,
segmenting each packet of the first type into packets of a second type,
transmitting said packets of the second type to said second network,
producing and transmitting at least one encoded duplicate of each of said packets of the second type to said second network, wherein said encoded duplicate packet allows a packet of said first type to be recreated in the event that not all packets of said second type are received at said second network,
in the event that a sufficient number of said packets of said second type and said encoded duplicate packets are not received to recreate said packet of said first type,
determining a loss ratio that represents a number of packets not recreated relative to a number of packets transmitted during a selected time interval,
dynamically adjusting an overhead required to produce said encoded duplicate packets to attempt to minimize said loss ratio,
detecting a significant increase in the determined loss ratio over a plurality of time intervals,
successively reducing the overhead required to produce said encoded duplicate packets in response to the detection of the significant increase in said determined loss ratio, and
determining whether the reduced overhead requirement stabilizes said determined loss ratio and, if the answer is affirmative, terminating the successive reduction of said overhead requirement.

2. The method of claim 1 in which the overhead required to produce said encoded duplicate packets is reduced by adjusting an encoding level in the production of said encoded duplicate packets in response to the detection of the significant increase in said determined loss ratio over said plurality of time intervals.

3. The method of claim 2 in which said encoding level is decreased sufficiently to stop increases in said loss ratio.

4. The method of claim 1 in which said significant increase in the determined loss ratio over said plurality of time intervals is detected by determining a change in said loss ratio over said time intervals, and comparing said change with a preselected threshold.

5. The method of claim 1 in which said significant increase in the determined loss ratio over said plurality of time intervals is detected by determining a change in an average of said loss ratio over said time intervals, and comparing said change with a preselected threshold.

6. A system for forwarding data transmissions from a first network to a third network via a second network, the system comprising
a first interface module for sending packets to and receiving packets from said first network,
a second interface module for sending packets to and receiving packets from said second network,
a segmenting module for segmenting each packet of a first type into packets of a second type, and producing and transmitting at least one encoded duplicate of each of said packets of said second type to said second network, wherein said encoded duplicate packet allows a packet of said first type to be recreated in the event that not all said packets of said second type are received at said second network, and
a reassembly module for determining whether a sufficient number of said packets of said second type and said encoded duplicate packets are received to recreate said packet of said first type, and in the event that said sufficient number of said packets of said second type and said encoded duplicate packets are not received to recreate said packet of said first type,
determining a loss ratio that represents a number of packets not recreated relative to a number of packets transmitted during a selected time interval,
dynamically adjusting an overhead required to produce said encoded duplicate packets to attempt to minimize said loss ratio,
detecting a significant increase in the determined loss ratio over a plurality of time intervals, successively reducing the overhead required to produce said encoded duplicate packets in response to the detection of the significant increase in said determined loss ratio, and determining whether the reduced overhead requirement stabilizes said determined loss ratio and, if the answer is affirmative, terminating the successive reduction of said overhead requirement.

7. The system of claim 6 in which the overhead required to produce said encoded duplicate packets is reduced by adjusting an encoding level in the production of said encoded duplicate packets in response to the detection of the significant increase in said determined loss ratio over said plurality of time intervals.

8. The system of claim 7 in which said encoding level is decreased sufficiently to stop increases in said loss ratio.

9. The system of claim 6 in which said significant increase in the determined loss ratio over said plurality of time intervals is detected by determining a change in said loss ratio over said time intervals, and comparing said change with a preselected threshold.

10. The system of claim 6 in which said significant increase in the determined loss ratio over said plurality of time intervals is detected by determining a change in an average of said loss ratio over said time intervals, and comparing said change with a preselected threshold.

11. A computer program product, comprising one or more non-transitory tangible media having a computer readable program logic embodied therein, the computer readable program logic configured to be executed to implement a method of forwarding data transmissions from a first network to a third network via a second network, the method comprising receiving packets of a first type from said first network, segmenting each packet of the first type into packets of a second type, transmitting said packets of the second type to said second network, producing and transmitting at least one encoded duplicate of each of said packets of the second type to said second network, wherein said encoded duplicate packet allows a packet of the first type to be recreated in the event that not all said packets of the second type are received at said second network, in the event that a sufficient number of said packets of the second type and said encoded duplicate packets are not received to recreate said packet of the first type, determining a loss ratio that represents a number of packets not recreated relative to a number of packets transmitted during a selected time interval, dynamically adjusting an overhead required to produce said encoded duplicate packets to attempt to minimize said loss ratio, detecting a significant increase in the determined loss ratio over a plurality of time intervals, successively reducing the overhead required to produce said encoded duplicate packets in response to the detection of the significant increase in said determined loss ratio, and determining whether the reduced overhead requirement stabilizes said determined loss ratio and, if the answer is affirmative, terminating the successive reduction of said overhead requirement.

12. The computer program product of claim 11 in which the overhead required to produce said encoded duplicate packets is reduced by adjusting an encoding level in the production of said encoded duplicate packets in response to the detection of the significant increase in said determined loss ratio over said plurality of time intervals.

13. The computer program product of claim 12 in which said encoding level is decreased sufficiently to stop increases in said loss ratio.

14. The computer program product of claim 11 in which said significant increase in the determined loss ratio over said plurality of time intervals is detected by determining a change in said loss ratio over said time intervals, and comparing said change with a preselected threshold.

15. The computer program product of claim 11 in which said significant increase in the determined loss ratio over said plurality of time intervals is detected by determining a change in an average of said loss ratio over said time intervals, and comparing said change with a preselected threshold.

* * * * *